United States Patent
Coze et al.

(10) Patent No.: US 12,541,641 B2
(45) Date of Patent: Feb. 3, 2026

(54) CUSTOM FORMULAS IN OFFICE CLOUD PLATFORM ADD-IN

(71) Applicant: SAP SE, Walldorf (DE)

(72) Inventors: Stephane Coze, Conflans Sainte Honorine (FR); Dietrich Eisenhardt, Karlsruhe (DE); Bing Sun, Saint Germain en Laye (FR); Laurent Le Floch, Cergy le Haut (FR)

(73) Assignee: SAP SE, Walldorf (DE)

( * ) Notice: Subject to any disclaimer, the term of this patent is extended or adjusted under 35 U.S.C. 154(b) by 553 days.

(21) Appl. No.: 18/160,781

(22) Filed: Jan. 27, 2023

(65) Prior Publication Data
US 2024/0256765 A1   Aug. 1, 2024

(51) Int. Cl.
G06F 40/18     (2020.01)
G06F 40/134    (2020.01)
H04L 67/02     (2022.01)

(52) U.S. Cl.
CPC ............ *G06F 40/18* (2020.01); *G06F 40/134* (2020.01); *H04L 67/02* (2013.01)

(58) Field of Classification Search
CPC ......... G06F 40/18; G06F 40/134; H04L 67/02
See application file for complete search history.

(56) References Cited

U.S. PATENT DOCUMENTS

| | | | |
|---|---|---|---|
| 7,421,648 B1 * | 9/2008 | Davis | G06F 40/18 715/205 |
| 7,793,210 B2 * | 9/2010 | Rank | G06F 40/18 717/136 |
| 2018/0157467 A1 * | 6/2018 | Stachura | G06F 8/38 |
| 2021/0409518 A1 * | 12/2021 | Logan | H04L 67/51 |

OTHER PUBLICATIONS

Learn.microsoft.com [online], "Create custom functions in Excel" Aug. 2022, retrieved on Jan. 3, 2023, retrieved from URL <https://learn.microsoft.com/en-us/office/dev/add-ins/excel/custom-functions-overview>, 5 pages.

* cited by examiner

*Primary Examiner* — Cao H Nguyen
(74) *Attorney, Agent, or Firm* — Fish & Richardson P.C.

(57) ABSTRACT

The present disclosure involves systems, software, and computer implemented methods for enabling custom formulas in a cloud platform office add-in. An example method includes automatically loading a public landing page of a cloud platform add-in of a spreadsheet application. The public landing page includes a declaration and a first implementation of at least one custom function. Login credentials for a customer tenant of the cloud platform are obtained. A redirect is performed to a private web application for the customer tenant. The private web application includes, for each custom function, a second implementation that is configured to retrieve customer-specific cloud platform data of the customer tenant. Each first implementation of a custom function is replaced with the second implementation of the custom function. In response to a user request in the spreadsheet application to use a first custom function, the second implementation of the custom function is invoked.

20 Claims, 13 Drawing Sheets

```
<Hosts>
    <Host Name="Workbook" />
</Hosts>
<Requirements>
    <Sets DefaultMinVersion="1.1">
        <Set Name="ExcelAPI" MinVersion="1.1" />
        <Set Name="CustomFunctionsRuntime" MinVersion="1.2" />
    </Sets>
</Requirements>                 302
<DefaultSettings>                               304
    <SourceLocation DefaultValue="https://ocean-landingpage-
val.cfapps.cpx.db.ondemand.com/office/?addinVersion=3.0.0.0&addinName=canary" />
</DefaultSettings>
<Permissions>ReadWriteDocument</Permissions>
<VersionOverrides xmlns="http://schemas.microsoft.com/office/
taskpaneappversionoverrides" xsi:type="VersionOverridesV1_0">
    <Hosts>
        <Host xsi:type="Workbook">
            <Runtimes>
                <Runtime resid="Ocean.SharedRuntime.Url" lifetime="long" />
            </Runtimes>
            <AllFormFactors>
                <ExtensionPoint xsi:type="CustomFunctions">      308
                    <Script>
                        <SourceLocation resid="Functions.Script.Url" />
                    </Script>                            310
                    <Page>
306                     <SourceLocation resid="Ocean.SharedRuntime.Url" />
                    </Page>                              312
                    <Metadata>
                        <SourceLocation resid="Functions.Metadata.Url" />
                    </Metadata>
                    <Namespace resid="Functions.Namespace" />
                </ExtensionPoint>
            </AllFormFactors>                        314
...
        </Host>
    </Hosts>
    <Resources>
        <bt:Images/>
        <bt:Urls/>
        <bt:ShortStrings>
            <bt:String id="Ocean.Tab1.TabLabel" DefaultValue="Ocean Canary" />
            <bt:String id="Ocean.Tab1.ConfigLabel" DefaultValue="Config" />
            <bt:String id="Ocean.ConfigButton.Label" DefaultValue="Configuration" />
            <bt:String id="Ocean.FeatureFlagsButton.Label" DefaultValue="Feature Flags" />
            <bt:String id="Ocean.DeleteColumn.Tooltip" DefaultValue=" " />
            <bt:String id="Functions.Namespace" DefaultValue="CPX" />
        </bt:ShortStrings>
    </Resources>                    316
```

```
/**
 * List all the dimensions available in the data source
 * @customfunction getDimensions
 * @helpurl https://help.cpx.com/docs/cpx_ANALYTICS_CLOUD_OFFICE/
29624d6020b74bf8817bb7df398e5cb6/55d84aa075774832be02eaa479453008.html?locale=en-US
 * @param {string} data_source Table or data source name
 * @param {number} [display] Display
 * @param {number} [orientation] Orientation
 * @param {number} [sort_order] sorting order
 * @returns {string[][]}
 */                       ┌─ 322
function getDimensions(data_source: string, display?: number, orientation?: number,
sort_order?: number): string[][] {
    throw new CustomFunctions.Error(CustomFunctions.ErrorCode.notAvailable,
getNotConnectedMessage());
}

/**
 * Get table name from a cell
 * @customfunction getTableName
 * @helpurl https://help.cpx.com/docs/cpx_ANALYTICS_CLOUD_OFFICE/
29624d6020b74bf8817bb7df398e5cb6/bd9e61711e014a10830806c14fe22b29.html?locale=en-US
 * @param {string} cell A cell of the SAC table
 * @param {CustomFunctions.Invocation} invocation Invocation object.
 * @returns {string}
 * @requiresParameterAddresses
 */                       ┌─ 324
function getTableName(cell: string, invocation: CustomFunctions.Invocation): string {
    throw new CustomFunctions.Error(CustomFunctions.ErrorCode.notAvailable,
      getNotConnectedMessage());
}
```

```
                            ┌─ 346
function executeCustomFunction(formula: string, parameters: unknown[]): unknown {
  // eslint-disable-next-line @typescript-eslint/no-explicit-any
  const windowAny: any = window as typeof window;
  if (!windowAny.cpx) {
    windowAny.cpx = {};
  }
  if (windowAny.cpx && windowAny.cpx.ocean &&  ┌─ 348
      windowAny.cpx.ocean.executeCustomFunction) {
    return windowAny.cpx.ocean.executeCustomFunction(formula, parameters);
  }                                        ┌─ 349
  throw new CustomFunctions.Error(CustomFunctions.ErrorCode.notAvailable);
}                                          ┌─ 350
/**
 * List all the dimensions available in the data source.
 * @customfunction getDimensions
 * @helpurl https://help.cpx.com/docs/getDimensions
 * @param {string} data_source Table or data source name
 * @param {number} [display] Display
 * @param {number} [orientation] Orientation
 * @param {number} [sort_order] sorting order
 * @returns {string[][]}
 */                              ┌─ 342
export function getDimensions(data_source: string, display?: number, orientation?:
number, sort_order?: number): string[][] {
  return executeCustomFunction('getDimensions', [data_source, display, orientation,
sort_order]) as string[][];
}

/**
 * Get table name from a cell
 * @customfunction getTableName
 * @helpurl https://help.cpx.com/docs/getTableName
 * @param {string} cell A cell of the table
 * @param {CustomFunctions.Invocation} invocation Invocation object.
 * @returns {string}
 * @requiresParameterAddresses
 */                        ┌─ 344
export function getTableName(cell: string, invocation: CustomFunctions.Invocation):
string {
  let cellAddress: string = '';
  if (invocation.parameterAddresses) {
    cellAddress = invocation.parameterAddresses[0];
  }
  return executeCustomFunction('getTableName', [cellAddress]) as string;
}
```

```
export function extendWindowObject(store: MainStore, serviceContainer: IServiceContainer): void {
    const trackedCustomFunctions: string[] = [];

/* eslint-disable @typescript-eslint/no-explicit-any */
    const windowAny: any = window as typeof window;
    if (!windowAny.cpx) {
        windowAny.cpx = {};
    }
    if (!windowAny.cpx.ocean) {
        windowAny.cpx.ocean = (windowAny.cpx as typeof windowAny.cpx & { ocean: IOceanWindowExtension });
        windowAny.cpx.ocean = {
            executeButtonClick: async (buttonId: string): Promise<void> => {
                const command = getButtonCommand(store.getState(), buttonId);
362             if (command) {
                    serviceContainer.getUsageTrackingService().recordRibbonButtonCommand(buttonId).catch((error: Error) => {
                        captureExceptionWithoutStore(error);
                    });
                    // this needs a dispatch() otherwise the recursive error handling fails.
                    // you can e.g. see this if you try to navigate, while refreshAll is still running.
                    //    --> the inner redux is catching the GridRefreshCancelled exception, which it should not.
                    await store.dispatch(command());
                }
            },
            executeCustomFunction: async (formulaName: keyof ICustomFunctions, parameters: unknown[]): Promise<any> => {
                const func: any = customFunctions[formulaName];
364             if (func !== undefined) {
                    if (!trackedCustomFunctions.includes(formulaName)) {
                        trackedCustomFunctions.push(formulaName);
                        serviceContainer.getUsageTrackingService().recordCustomFunction(
                            serviceContainer.getSpreadsheetService().getDocumentUrl() ?? '', formulaName,
                            store.getState()).catch((error: Error) => {
                            captureExceptionWithoutStore(error);
                        });
366                 }
                    return func.apply(customFunctions, [store.dispatch, store.getState, serviceContainer, ...parameters]);
                }
                throw new CustomFunctions.Error(CustomFunctions.ErrorCode.notAvailable);
            },
            enableFeature: enableFeature,
            disableFeature: disableFeature,
            resetAllFeatureFlags: resetAllFeatureFlags,
            listAllFeatureFlags: listAllFeatureFlags
        };
    }
360
```

FIG. 3D

```
export const customFunctions: ICustomFunctions = {
  getTableName: async (        ~381
    dispatch: ThunkDispatchFunction,
382 getState: GetStateFunction,
    serviceContainer: IServiceContainer,
    cellAddress: string): Promise<string> => {
    const rootState = getState();~384
    if (cellAddress.length <= 0) {
      const errorMsg = t((s: ITranslation) =>
s.errorMessages.customFunctions.cellAddressInvalid, { cellAddress: cellAddress });
      throw new CustomFunctions.Error(CustomFunctions.ErrorCode.invalidReference,
errorMsg);
    }
    const sacTableId = await
serviceContainer.getSpreadsheetService().getOceanNamedRangeOfCell(cellAddress);
    if (sacTableId) {
      const tableName = getTableId(sacTableId);
      if (tableName && rootState.document.crosstabs.byId[tableName]) {
        return tableName; }}  ~385
    const errorMsg = t((s: ITranslation) =>
s.errorMessages.customFunctions.cellAddressNotInTable, { cellAddress: cellAddress });
    throw new CustomFunctions.Error(CustomFunctions.ErrorCode.invalidValue, errorMsg);
  }, 383
  getDimensions: async (dispatch: ThunkDispatchFunction, getState: GetStateFunction,
serviceContainer: IServiceContainer, dataSource: string,
    display: MemberDisplay, orientation: Orientation, sortOrder: SortOrder):
Promise<string[][]> => {
    const rootState = getState(); ~387
    let result: string[][] = (display === MemberDisplay.Id || display ===
MemberDisplay.Description || display === MemberDisplay.FullId) ? [[]] : [[], []];
    const queryId = getQueryIdByCrosstabOrFormulaDataSourceId(rootState, dataSource);
    if (queryId === undefined) {                                            ~388
      const errorMsg = t((s: ITranslation) =>
s.errorMessages.customFunctions.tableOrFormulaDataSourceNotFound, {
tableOrFormulaDatasourceId: dataSource });
      throw new CustomFunctions.Error(CustomFunctions.ErrorCode.invalidValue,
errorMsg);
    }                      /389
    const dimensionList = ((sortOrder ?? SortOrder.None) === SortOrder.None) ?
rootState.document.queries.byId[queryId].availables
      : sortBy(rootState.document.queries.byId[queryId].availables,
        [(dimension: IDimension): string => (display === MemberDisplay.Description
          || display === MemberDisplay.DescriptionAndId) ?
          dimension.description?.toLowerCase() ?? dimension.id.toLowerCase() :
dimension.id.toLowerCase()]);
    if (sortOrder === SortOrder.SortDescending) {
      dimensionList.reverse();
    }
    dimensionList.forEach((dimension: IDimension) => {
      switch (display) {
        default:
          result[0].push(dimension.id);
          result[1].push(dimension.description ?? dimension.id);
          break; }});
    return orientation === Orientation.Horizontal ? result : result[0].map((text:
string, index: number) =>
      (display === MemberDisplay.Id || display === MemberDisplay.Description || display
=== MemberDisplay.FullId) ? [text] :
        [text, result[1][index]]);
  },
```

```
                391
                 (
overwriteDimensionFilter: async (
    dispatch: ThunkDispatchFunction,
    getState: GetStateFunction,
    serviceContainer: IServiceContainer,
    crosstabIds: string[][],
    dimensionName: string,
    members: string[][],
    selectionTypes?: number[][],
    memberDisplay?: MemberDisplay,
    separator?: string
  ): Promise<string> => {
    const crosstabIdList: string[] = getRegularCrosstabIds(crosstabIds);
    let memberDisplayOption = memberDisplay??MemberDisplay.Description;
    let searchOption = getSearchOption(memberDisplayOption);
    let memberIdDescriptionSeparator = separator ?? ' - ';
    const regularMembers: string[] = getRegularMembers(members, memberDisplayOption,
memberIdDescriptionSeparator);
    const flattenedSelectionTypes: number[] = (selectionTypes !== undefined) ?
flatten(selectionTypes) : [SelectionType.SELF_AND_DESCENDANTS];
    let rootState = getState();  ~392
    const metadataCacheService = serviceContainer.getMetadataCacheService();
    const queryIds = getQueryIds(rootState, crosstabIdList);
    checkOnSameModel(rootState, crosstabIdList);
    // set filter for each query
    let dimensionFound: IDimension | undefined;
    let queryResult: QueryResult;
    for (let i = 0; i < crosstabIdList.length; i++) {
      const queryId = queryIds[i];
      dimensionFound = findDimension(rootState, queryId, dimensionName);
      if (dimensionFound === undefined) {                            ^393
        const errorMsg = t((s: ITranslation) =>
s.errorMessages.customFunctions.dimensionNotFound, { dimensionName: dimensionName });
        throw new CustomFunctions.Error(CustomFunctions.ErrorCode.invalidValue,
errorMsg);
      }
      queryResult = await buildDimensionFilter(metadataCacheService, crosstabIdList[i],
queryId, dimensionFound.id,
        regularMembers, flattenedSelectionTypes, searchOption);   394
      const oldDimensionFilter =                                  /
        await serviceContainer.getOlapService().getHierarchySelectionFilter(queryId,
dimensionFound.id);
      if (isEqual(oldDimensionFilter, queryResult.dimensionFilter)) {
        continue;     ^395
      }
      dispatch(new OverwrittenDimensionFilterAddedAction(crosstabIdList[i],
dimensionFound.id, queryResult.dimensionFilter));
    }
    return t((s: ITranslation) => s.overwrittenDimensionFilter.overwriteFunctionResult,
{
      dimension: dimensionFound!.description ?? dimensionFound!.id,
      members: Object.values(queryResult!.members).map((m: IDimensionMemberSelected) =>
m.displayKey).join(', ')
    });
  },
```

CUSTOM FORMULAS IN OFFICE CLOUD PLATFORM ADD-IN

TECHNICAL FIELD

The present disclosure relates to computer-implemented methods, software, and systems for enabling custom formulas in an office cloud platform add-in.

BACKGROUND

Productivity applications such as word processing applications and spreadsheet applications traditionally have been installed directly onto user computers. Other options have become available, such as online web-based applications where a user accesses a productivity application using a browser with functionality of a web-based productivity application being provided by web resources dynamically provided to the user's browser. Accordingly, users can access latest application functionality without having to re-download and reinstall a locally-installed application.

SUMMARY

The present disclosure involves systems, software, and computer implemented methods for enabling custom formulas in a cloud platform office add-in. One example method includes: upon loading of a spreadsheet application, automatically loading a manifest for a cloud platform add-in of the spreadsheet application, wherein the manifest refers to a public landing page for the cloud platform add-in; in response to loading of the manifest, automatically loading the public landing page of the cloud platform add-in of the spreadsheet application, wherein the public landing page includes a declaration and a first implementation of at least one custom function; obtaining, using the public landing page, login credentials for a customer tenant of a cloud platform; redirecting, from the public landing page, to a private web application for the customer tenant for the cloud platform add-in, wherein the private web application includes for each of the at least one custom function, a second implementation of the custom function that is configured to retrieve customer-specific cloud platform data of the customer tenant, wherein the redirecting comprises replacing, for each custom function, the first implementation of the custom function with the second implementation of the custom function; receiving a user request in the spreadsheet application to use a first custom function; invoking the second implementation of the first custom function to retrieve customer-specific cloud platform data for the customer tenant; and providing retrieved customer-specific cloud platform data for the customer tenant to the spreadsheet application for rendering in the spreadsheet application.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for enabling custom formulas in a cloud platform office add-in.

FIG. 2 is a block diagram illustrating an example system for enabling custom formulas in a cloud platform office add-in.

FIG. 3A illustrates an example manifest.

FIG. 3B illustrates example custom function declarations.

FIG. 3C illustrates example pseudo custom function implementations.

FIG. 3D illustrates example code for assigning full custom function implementation code to a global variable.

FIG. 3E illustrates full custom function implementations.

FIG. 3F illustrates another full custom function implementation.

FIGS. 4A-4D illustrate example spreadsheet application user interfaces.

FIG. 5 is a flowchart of an example method for enabling custom formulas in a cloud platform office add-in.

DETAILED DESCRIPTION

Figure 1:
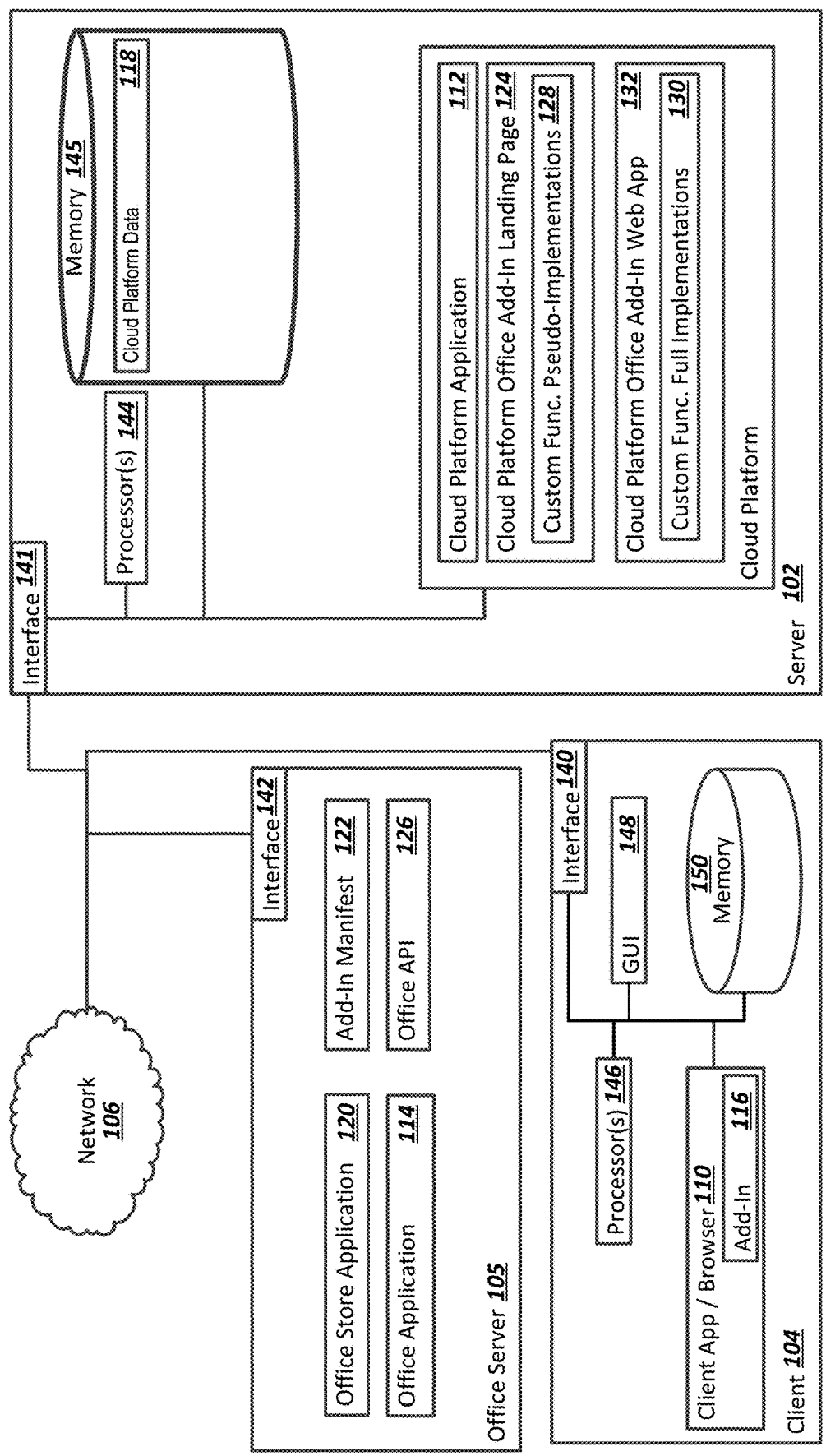

An office productivity suite can enable customers to define add-ins that provide custom functionality on top of base functionality of the office suite. For instance, a cloud platform provider can develop and provide add-in(s) that enable access to cloud platform data within office application(s). For instance, for a spreadsheet application, a cloud platform office add-in can enable a user to use the spreadsheet application to view and interact with data obtained from the cloud platform.

The office suite provider can provide an API (Application Programming Interface) that can be used to develop the cloud platform office add-in. The API can allow add-ins developed by the cloud provider to be fully integrated within the spreadsheet application. However, the API, which may be developed by the office suite provider and not the cloud provider, may introduce certain technical limitations and/or constraints regarding add-in functionality and configuration. For example, the API may pose certain technical challenges when the cloud provider desires to provide, using the cloud platform office add-in, custom functions in the spreadsheet application that access cloud platform data. A custom function can, once loaded, be used by a spreadsheet application user in essentially a same manner as a built-in function.

The API may require that the cloud provider provide, for an add-in such as the cloud platform office add-in, a manifest file and a web application. For a custom function, the API may require that custom functions are implemented in the web application specified in the manifest. However, the cloud platform office add-in may be implemented using a two parts architecture that includes a public landing page that allows users to authenticate which then redirects to a private web application hosted by an appropriate tenant of the cloud platform. Based on how the cloud platform office add-in is implemented and based on requirements of the API, the API may require that custom functions are defined in the public landing page of the cloud-platform office add-in. However, custom function implementations that are defined in the public landing page are not capable of accessing customer-specific cloud platform data of the cloud platform tenant.

To meet the API requirements and to also enable custom function access to customer-specific cloud platform data, a technical solution can be implemented in which: 1) custom functions are declared in the public landing page and provided with pseudo implementations; and 2) detailed implementations of the custom functions are included in the private application portion of the cloud platform office add-in. The detailed implementations can be used rather than the pseudo-implementations after a user has successfully authenticated to the cloud platform. Accordingly, the cloud-platform office add-in can successfully integrate with the API provided by the office suite provider, to enable the cloud platform office add-in to seamlessly integrate with the spreadsheet application. The technical solution enables the cloud platform office add-in to provide custom functions that can access customer-specific cloud platform data.

Additionally, advantages of the API may be realized in that the API can enable running of add-ins without explicit user installation of the add-ins. The spreadsheet application can retrieve the manifest upon startup, and then invoke current implementations of the custom functions as needed. Accordingly, latest custom function code can be available on demand for spreadsheet application users, which can be an improvement over stale code in explicitly-installed add-ins, as may occur in prior add-in approaches. An administrator can simply publish a new or updated manifest, rather than installing add-ins to specific users. As such, substantial resource savings can be realized, as compared to installing add-ins for each user of a large corporate user base, for example.

FIG. 1 is a block diagram illustrating an example system 100 for enabling custom formulas in a cloud platform office add-in. Specifically, the illustrated system 100 includes or is communicably coupled with a server 102, a client device 104, an office server 105, and a network 106. The server 102 can be part of a cloud platform, for example. Although shown separately, in some implementations, functionality of two or more systems or servers may be provided by a single system or server. In some implementations, the functionality of one illustrated system or server may be provided by multiple systems or servers.

A user of the client device 104 can use a client application/browser 110. The client application/browser 110 may be a client-side version of a cloud platform application 112, a client-side version of an online office application 114 provided by the office server 105, or may be a locally-installed application (e.g., a locally-installed office application). When the client application/browser 110 is a client-side or local version of an office application, the client application/browser 110 can include or be associated with a cloud platform office add-in 116 offered by the cloud platform. The cloud platform office add-in 116 can enable the user to view and interact with data in the client application/browser 110 that has been provided to the client device 104 as a copy of cloud platform data 118 of the cloud platform. The cloud platform data 118 can be ERP (Enterprise Resource Planning) data or other data from an ERP or other type of backend database. The cloud platform office add-in 116 can be obtained from an office store application 120. For example, the cloud platform provider can provide an add-in manifest 122 for the cloud platform office add-in 116.

As described in more detail below, the cloud platform office add-in 116 can be implemented, in part, using a public landing page 124. The public landing page 124 can enable a user to authenticate to the cloud platform. The public landing page 124 can be referenced in the manifest 122. An office API 126 may specify that custom functions, if included in the cloud platform office add-in 116, are to be defined in the public landing page 124. However, to enable custom function code to use cloud platform data 118, an approach can be used of using pseudo implementations 128 in the public landing page 124 and full implementations 130 in a private web application of the cloud platform add-in 116. The pseudo implementations 128 can be used when no authenticated connection exists between the office application and the cloud platform and the full implementations 130 can be used once there is an authenticated connection between the office application and the cloud platform. Further details are described below.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or another suitable server.

Interfaces 140, 141, and 142 are used by the client device 104, the server 102, and the office server 105, respectively, for communicating with other systems in a distributed environment—including within the system 100—connected to the network 106. Generally, the interfaces 140, 141, and 142 each comprise logic encoded in software and/or hardware in a suitable combination and operable to communicate with the network 106. More specifically, the interfaces 140, 141, and 142 may each comprise software supporting one or more communication protocols associated with communications such that the network 106 or interface's hardware is operable to communicate physical signals within and outside of the illustrated system 100.

The server 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the server 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 145. In some implementations, the server 102 includes multiple memories. The memory 145 may include any type of memory or database module and may take the form of volatile and/or non-volatile memory including, without limitation, magnetic media, optical media, random access memory (RAM), read-only memory (ROM), removable media, or any other suitable local or remote memory component. The memory 145 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application/browser 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 146. Each processor 146 included in the client device 104 may be a central processing unit (CPU), an application specific integrated circuit (ASIC), a field-programmable gate array (FPGA), or another suitable component. Generally, each processor 146 included in the client device 104 executes instructions and manipulates data to perform the operations of the client device 104. Specifically, each processor 146 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 148.

The GUI 148 of the client device 104 interfaces with at least a portion of the system 100 for any suitable purpose, including generating a visual representation of the client application/browser 110. In particular, the GUI 148 may be used to view and navigate various Web pages, or other user interfaces. Generally, the GUI 148 provides the user with an efficient and user-friendly presentation of business data provided by or communicated within the system. The GUI 148 may comprise a plurality of customizable frames or views having interactive fields, pull-down lists, and buttons operated by the user. The GUI 148 contemplates any suitable graphical user interface, such as a combination of a generic web browser, intelligent engine, and command line interface (CLI) that processes information and efficiently presents the results to the user visually.

Memory 150 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 150 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
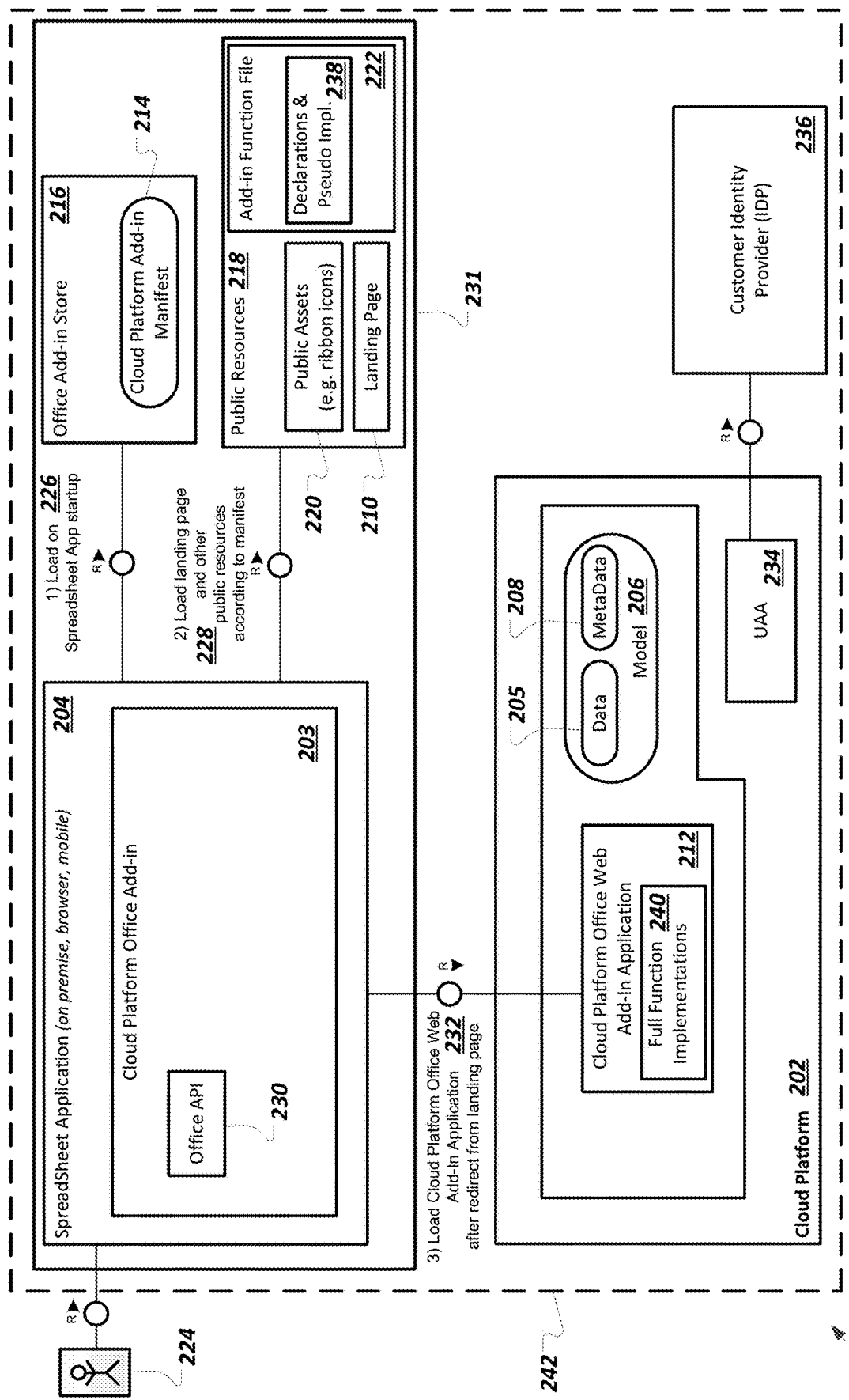

FIG. 2 is a block diagram illustrating an example system 200 for enabling custom formulas in a cloud platform office add-in. A provider of a cloud platform 202 can develop and provide a cloud platform office add-in 203 that enables access, in a spreadsheet application instance 204, to cloud platform data 205 that is described in a model 206. The model 206 also includes metadata 208 about the cloud platform data 205 (or cloud platform data sources that are represented by the model 206). The metadata 208 can include information such as filter information, dimension information, etc., about the cloud platform data 205.

The cloud platform office add-in 203 can be implemented using a public landing page 210 and a web application 212 hosted by the cloud platform 202. The cloud platform provider can deploy the cloud platform office add-in 203 by providing a manifest 214 to an office add-in store 216. The manifest 214 can refer to public resources 218, such as public assets 220 (e.g., ribbon icons) and the public landing page 210.

FIG. 3A illustrates an example manifest 300. The manifest 300 can include different settings for enabling definition of custom functions for the cloud platform office add-in. A requirement setting 302 specifies that the cloud platform office add-in is to be allowed in office application environments that support custom functions. A default source location setting 304 can be used to fully qualify resource references. An extension point element 306 can be used to provide information for custom functions.

A script element 308 specifies a link to a script file that includes custom function definitions (e.g., minimal implementations for this technical solution). A page element 310 specifies a link to a web page for the defined custom functions (e.g., the public landing page for the cloud platform office add-in). A metadata element 312 defines metadata settings used by the custom functions. A namespace element 314 defines a namespace used by the custom functions. A namespace may be specified using a defined string element 316. For instance, the namespace in this example may be "CPX" (e.g., representing "cloud platform X").

Referring again to FIG. 2, a user 224 can, as a one-time action, download the cloud platform office add-in 203 from the office add-in store 216 to associate the manifest 214 with the spreadsheet application instance 204. Accordingly, as shown in a step one 226, the manifest 214 is loaded upon startup of the spreadsheet application instance 204. As mentioned, the manifest 214 refers to the public landing page 210. Accordingly and as shown in a step two 228, the public landing page 210 is loaded (along with other public resources 218 referenced in the manifest 214) in the cloud platform office add-in 203, in response to a user selecting an icon or other UI element corresponding to the cloud platform office add-in 203. The cloud platform office add-in 203 can use an office API 230 to communicate with the spreadsheet application instance 204, such as to invoke functions of the spreadsheet application, including declaring and triggering execution of custom functions.

The office API 230, as part of its support for custom functions, may require that custom functions are defined in the public landing page 210. However, the cloud platform provider may desire to include, in the cloud platform add-in 203, custom functions that can act on the model 206. The model 206 (and the cloud platform data 205 and the metadata 208) can be customer-specific (e.g., specific to a particular tenant of the cloud platform 202). However, tenant-specific data may not be accessible by the public landing page 210 because the landing page 210 is public and works without any need of authentication. Accordingly, custom function code that accesses cloud platform data 205 and/or metadata 208 is not included in the public landing page 210.

To solve the technical limitation of the cloud platform office add-in 203 not being able to access customer-specific data, a technical solution of using both the public landing page 210 and the web application 212 can be used. The public landing page 210 can enable the user 224 to log in to a customer-specific tenant of the cloud platform 202 using a UAA (User Account and Authentication) component 234 and a customer IDP (Identity Provider) 236. As described in a step three 232, the public landing page 210 can redirect to the web application 212 upon successful authentication to the cloud platform 202.

The add-in function file 222 that is loaded with the public landing page 210 can include custom function declarations and pseudo implementations 238. The pseudo-implementations can be invoked, for example, if a request is made to use a custom function before authentication to the cloud platform has occurred. The pseudo implementation can include code to inform the user that the custom function requires logging into the cloud platform before use.

As described in more detail below, upon successful authentication to the cloud platform 202, the pseudo-implementations can be overwritten (e.g., using a global variable) with full function implementations 240 that are included in the web application 212. The full function implementations 240 can include, for example, functionality to retrieve data regarding the model 206, for example. Specific examples are described in more detail below. The user 224 can use custom functions when using the spreadsheet application instance 204. When the custom function is invoked by the spreadsheet application instance 204, the spreadsheet application instance 204 can, using the office API 230, invoke the full function implementation if the user has authenticated (e.g., as invoke the pseudo implementation if the user has not authenticated). A box 242 illustrates an expanded scope of the technical solution of using both the public landing page 210 and the web application 212 (e.g., the expanded scope includes both the spreadsheet application instance 204 and the cloud platform 202, enabling custom functions implemented using the technical solution to run in the spreadsheet application instance 204 yet retrieve data specific to the customer tenant of the cloud platform 202, such as specific model 206 information.

FIG. 3B illustrates example custom function declarations 320. The function declarations 320 can be included in the public landing page (e.g., the public landing page 210) for the cloud platform office add-in. The function declarations include a declaration for a getDimensions function 322 and a getTableName function 324. Basic implementations are included that can be called if the user happens to use a respective custom function before authenticating to the cloud platform. A basic implementation can inform the user that the user must be signed into the cloud platform to use the respective function.

FIG. 3C illustrates example pseudo custom function implementations 340. The pseudo custom function implementations 340 include pseudo-implementations for a getDimensions function 342 and a getTableName function 344. Other pseud-implementations can be included. Each pseudo-implementation can invoke a executeCustomFunction function 346. As shown by a test condition 348, the executeCustomFunction function 346 looks for an implementation of executeCustomFunction in a global variable windowAny.cpx.ocean. If the implementation is found in the global variable, execution of the executeCustomFunction is triggered as shown by an invocation 349. If an implementation is not found in the global variable, an error is thrown, as shown by a statement 350. As an example, if a connected user (e.g., a user connected to the cloud platform) triggers execution of either a getDimensions or a getTableName custom function in the office application, the pseudo implementation 342 or 344 is called, respectively, which in turn results in invocation of the executeCustomFunction 346, which in turn results in execution of a windowAny.cpx.ocean.executeCustomFunction function, which is described below with respect to FIG. 3D.

FIG. 3D illustrates example code 360 for assigning full custom function implementation code to a global variable. The code 360 can be executed, for example, in the private web application portion of the cloud platform office add-in upon successful connection to the cloud platform. The code 360 includes assigning code that corresponds to full custom function implementations to a global variable 362 that was declared in the public landing page portion of the cloud platform office add-in. The code assigned to the global variable 362 includes an executeCustomFunction function 364 that includes usage tracking functionality along with a call 366 to apply the custom function. The function 364 corresponds to the statement 349 discussed above.

FIG. 3E illustrates full custom function implementations 380. The full custom function implementations 380 includes a data structure 381 that includes full custom function code for a getTableName custom function 382 and a getDimensions function 383. Code for other custom functions can also be included (e.g., as shown in FIG. 3F). The code shown in FIG. 3E illustrates code assigned to the global variable upon connection. The code shown in FIG. 3E can be executed when a custom function execution is triggered in the office application.

Custom functions can retrieve and use application state information that is populated with application settings and customer data and parameters. The application state can be created and populated when a user connects to the cloud platform using the cloud platform office add-in. The getTableName custom function 382 retrieves application state using a statement 384 and uses the retrieved state, for example, using a statement 385. Similarly, the getDimensions custom function 383 retrieves application state using a statement 387 and uses the retrieved state, for example, using statements 388 and 389.

FIG. 3F illustrates another full custom function implementation 390. The full custom function implementation 390 includes code for an overwriteDimensionFilter custom function 391. The code shown in FIG. 3F can be included in the data structure 381 described above with respect to FIG. 3E, for example. The overwriteDimensionFilter custom function 391 includes code statements 392 and 393 to retrieve and use application state, respectively. Also included are statements 394 and 395 which correspond to connecting to the cloud platform to retrieve customer-specific data and using retrieved customer-specific data, respectively.

Figure 4A:
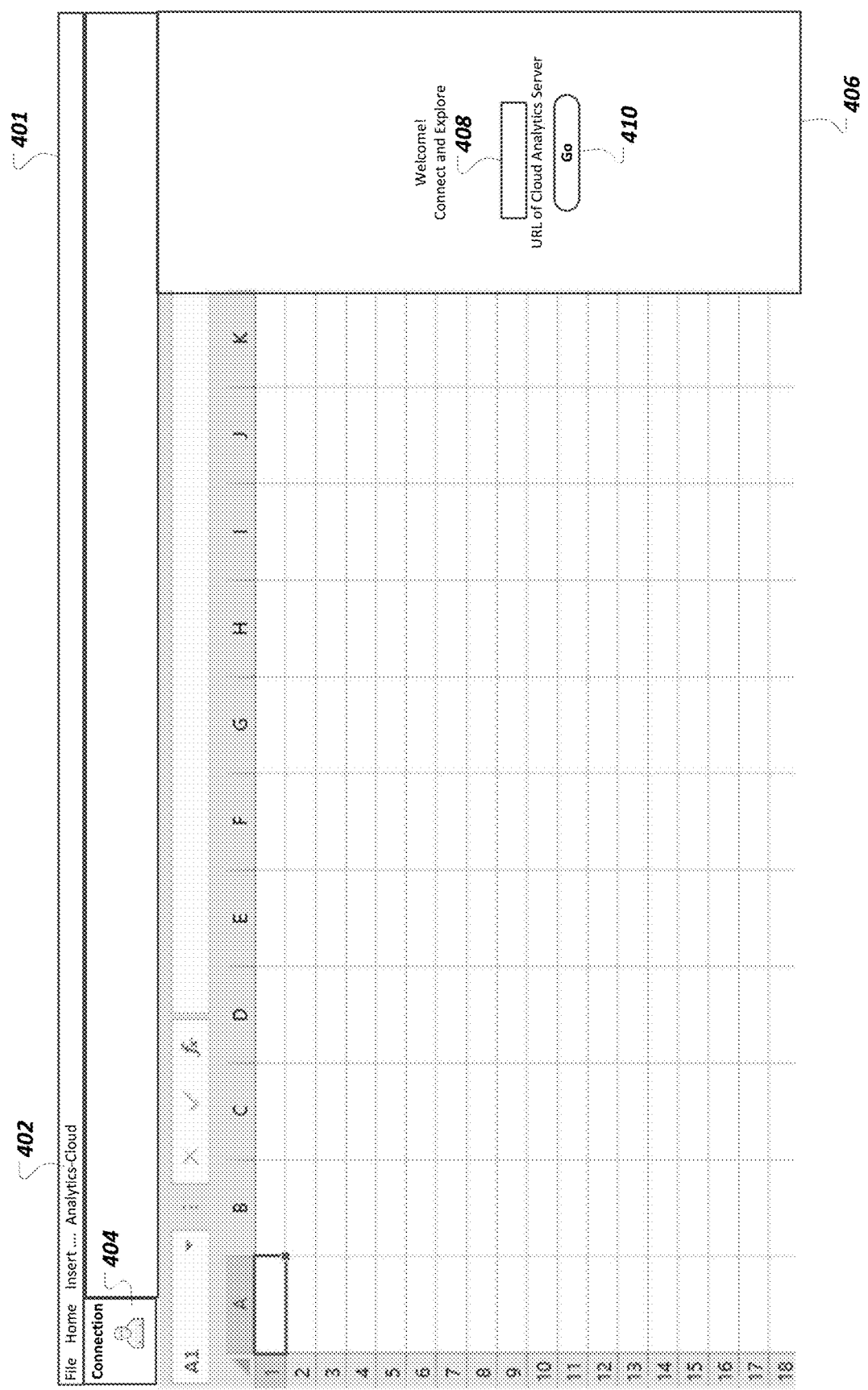

FIGS. 4A-4D illustrate example spreadsheet application user interfaces 400, 420, 440, and 460 respectively. As shown in FIG. 4A, a menu bar 401 includes a menu item 402 for a cloud platform office add-in. Selection of the menu item 402 can result in display of a connection icon 404. Selection of the connection icon 404 can result in display of a landing page 406. The user can enter a tenant URL (Uniform Resource Locator) of a cloud platform tenant in a text box 408 and request a connection to the tenant by selecting a button 410.

Figure 4B:
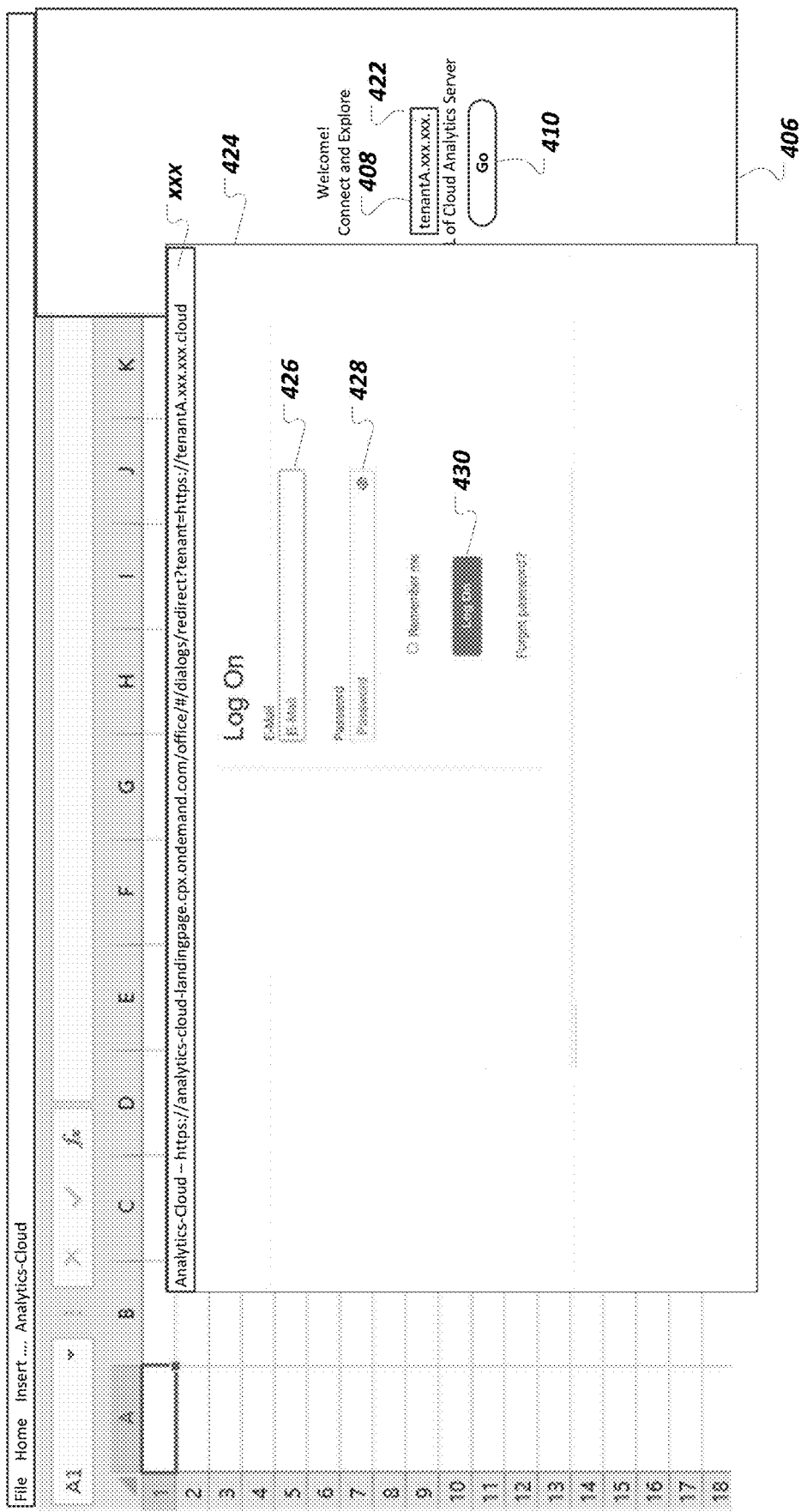

As shown in FIG. 4B, the user has entered a tenant URL 422 in the text box 408. After selection of the button 410, a login page 424 can be displayed. The login page 424 can enable the user to enter a login identifier for the cloud tenant (e.g., an E-mail address) in a text box 426 and a password for the cloud tenant in a text box 428. The user can select a login button 430 after providing the login identifier and password. The login page 424 can delegate user authentication to the IDP of the cloud platform. If the login page 424 receives a successful authentication from the IDP, the login page 424 can redirect to the cloud platform with the authentication token. For example, the private web application portion of the cloud platform office add-in can be loaded and the custom function basic implementations (e.g., as shown in FIG. 3B) can be overwritten with the full custom function implementation versions of the private web application (e.g., as shown in FIGS. 3D and 3E).

Figure 4C:
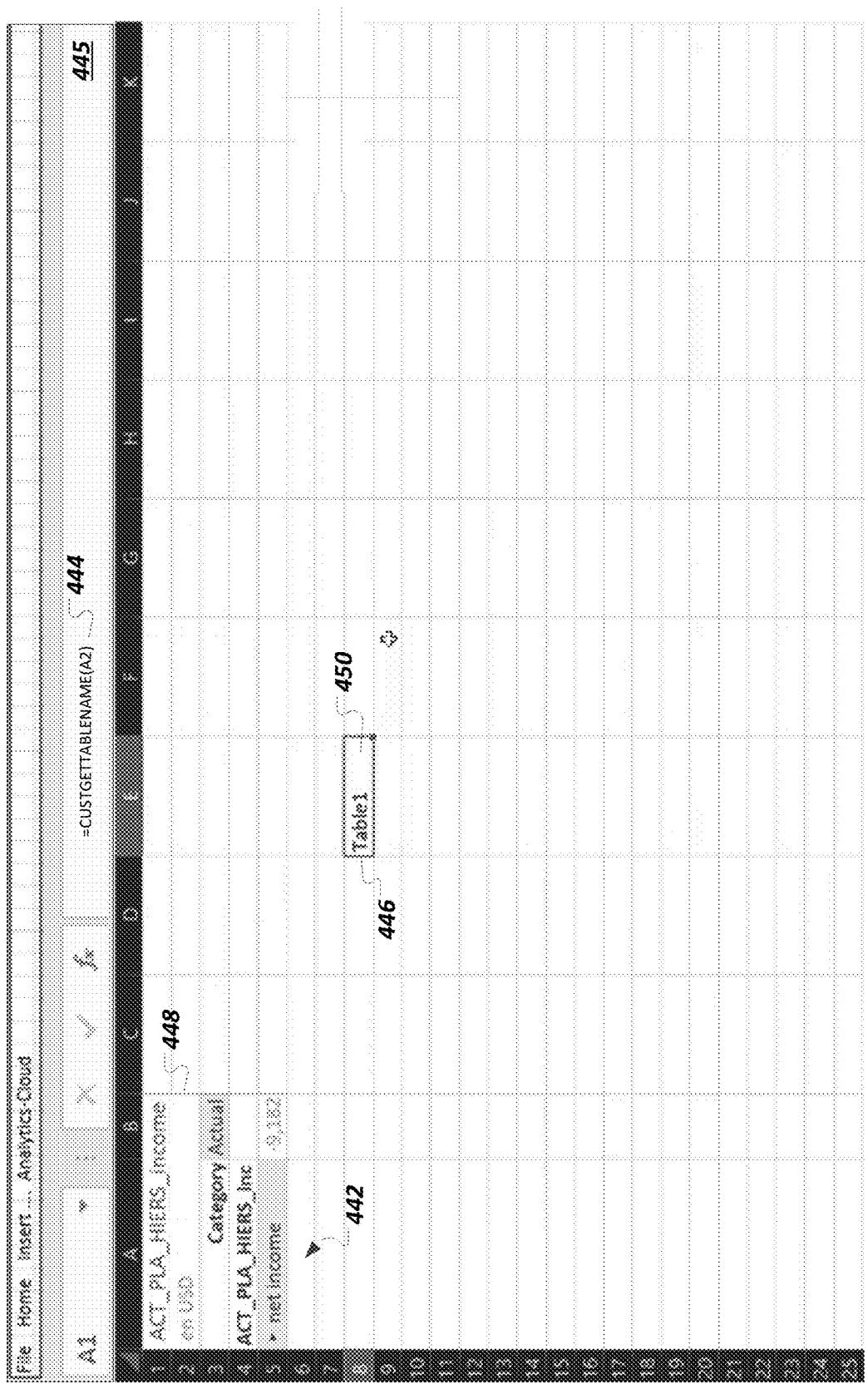

The spreadsheet application user interface 440 of FIG. 4C illustrates use of custom functions. As mentioned, the cloud analytics plug-in enables users to obtain cloud platform data for use in spreadsheet(s). For instance, the cloud analytics add-in enables users to add data from a table from the cloud platform to a spreadsheet. For instance, the user has selected a model representing cloud platform data and has selected a table from the model. Table information 442 is displayed in cells of the spreadsheet after the user has selected a table.

After table information has been added, the user can then use custom functions that act on cloud platform table data.

For example, the user has entered a CUSTGETTABLENAME custom function name 444 in a function bar 445 when a cell 446 is selected as a current cell. The CUSTGETTABLENAME custom function can retrieve a table name of a cloud platform data source. The user has applied the CUSTGETTABLENAME custom function to an A2 worksheet cell 448 that includes an added table. The cell 446 displays, after the custom function is invoked, a function output 450 of "Table1". The "Table1" value can correspond to the name of a grid that has been generated to display the content of the model "ACT_PLA_HIERS_income."

Figure 4D:
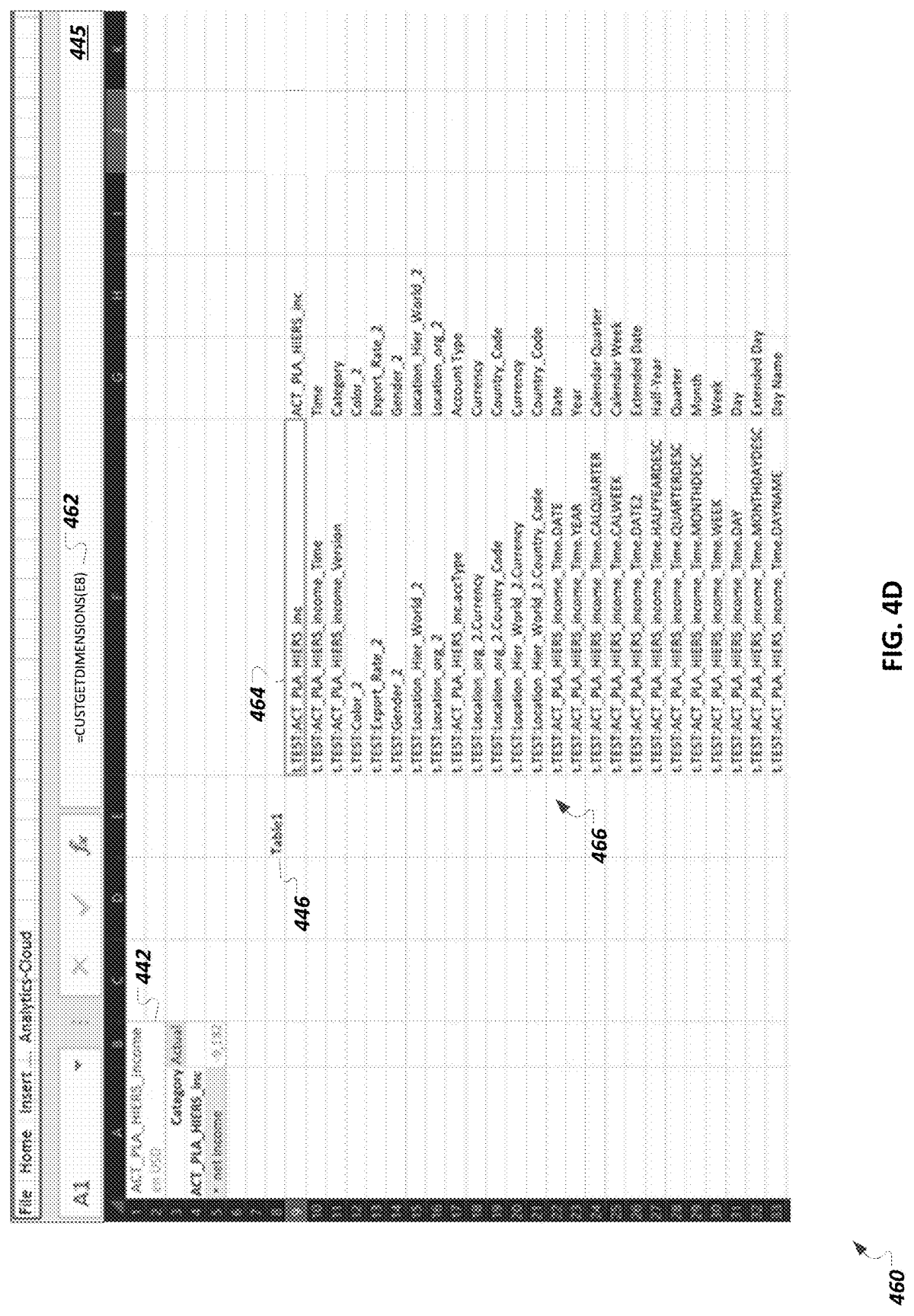

The spreadsheet application user interface 460 of FIG. 4D illustrates further use of custom functions. For example, the user has entered a CUSTGETDIMENSIONS custom function name 462 in the function bar 445 when a cell 464 is selected as a current cell. The CUSTGETDIMENSIONS custom function can retrieve dimensions of a cloud platform data source when provided an input of a table name that has been provided by the CUSTGETTABLENAME custom function. For example, the user has applied the CUSTGETDIMENSIONS custom function to the cell 446 that includes the Table1 table name. Custom function output 466 that is generated from invocation of the CUSTGETDIMENSIONS custom function is displayed in the worksheet, starting at the cell 464.

Figure 5:
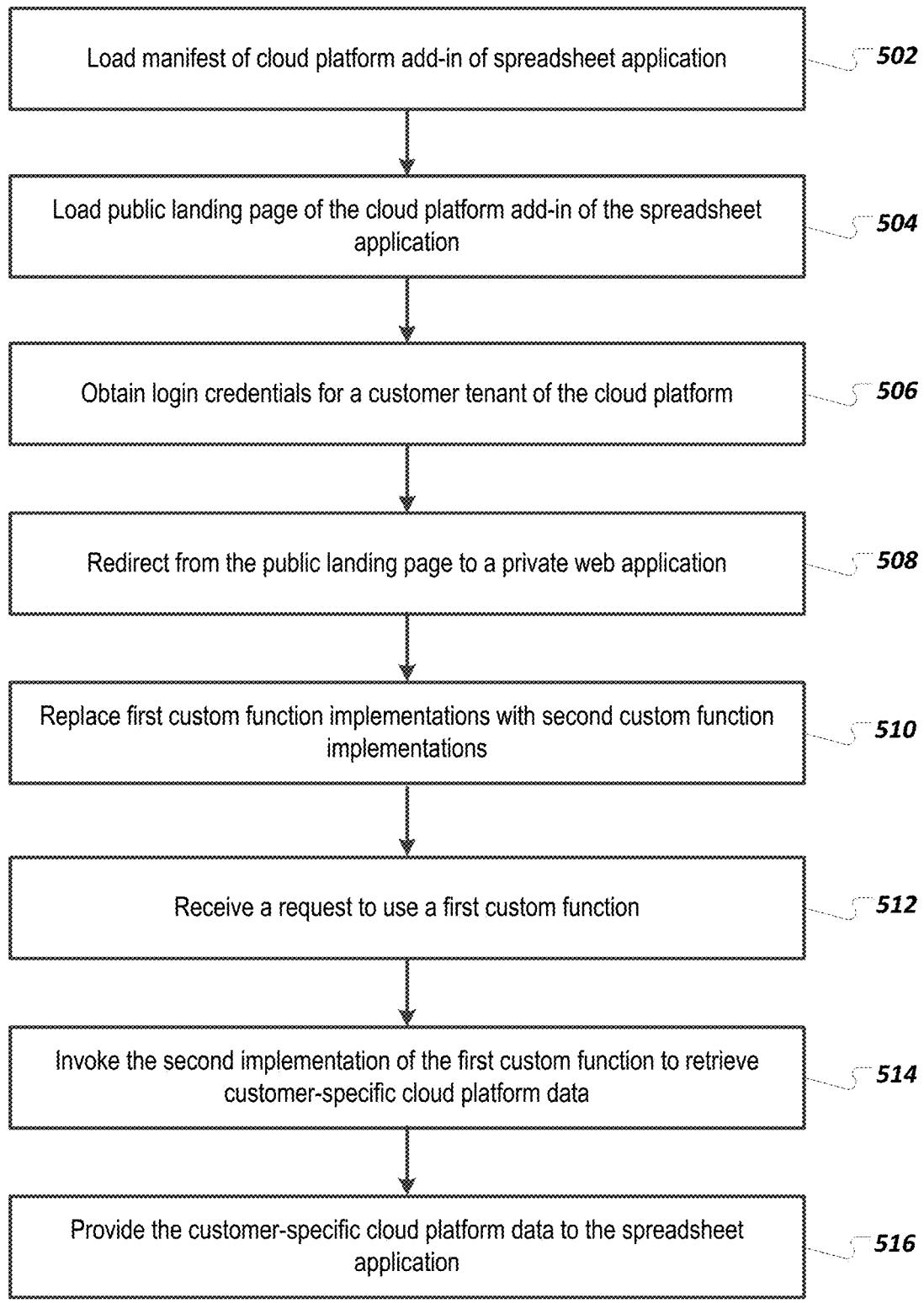

FIG. 5 is a flowchart of an example method 500 for enabling custom formulas in a cloud platform office add-in. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the server 102 of FIG. 1.

At 502, upon loading of a spreadsheet application, a manifest for a cloud platform add-in of the spreadsheet application is automatically loaded. The manifest refers to a public landing page for the cloud platform add-in of the spreadsheet application. The cloud platform add-in of the spreadsheet application may be referred to as a cloud platform office add-in. The spreadsheet application can be a desktop application or a web application.

At 504, in response to loading of the manifest, the public landing page of the cloud platform add-in is loaded. The public landing page includes a declaration and a first implementation of at least one custom function.

At 506, login credentials for a customer tenant of a cloud platform are obtained using the public landing page.

At 508, a redirection is performed from the public landing page to a private web application for the customer tenant for the cloud platform add-in. The private web application includes for each of the at least one custom function, a second implementation of the custom function that is configured to retrieve customer-specific cloud platform data of the customer tenant.

At 510, for each custom function, the first implementation of the custom function is replaced with the second implementation of the custom function. First implementations can be replaced by using a global variable that is declared in the public landing page.

At 512, a user request is received in the spreadsheet application to use a first custom function.

At 514, the second implementation of the first custom function is invoked to retrieve customer-specific cloud platform data for the customer tenant. The customer-specific cloud platform data can include customer-specific data model information or metadata about the data model information.

At 516, retrieved customer-specific cloud platform data for the customer tenant is provided to the spreadsheet application for rendering in the spreadsheet application.

As another example, a second user request can be received from a user in the spreadsheet application to use a second custom function when the user is not authenticated to the cloud platform. A determination can be made that the user is not authenticated to the cloud platform. In response to determining that the user is not authenticated to the cloud platform, the first implementation of the second custom function can be invoked rather than the second implementation. The first implementation of the second custom function can be configured to notify the user that the user has to be authenticated to the cloud platform to use the second implementation of the second custom function.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   upon loading of a spreadsheet application, automatically loading a manifest for a cloud platform add-in of the spreadsheet application, wherein the manifest refers to a public landing page for the cloud platform add-in;
   in response to loading of the manifest, automatically loading the public landing page of the cloud platform add-in of the spreadsheet application, wherein the public landing page includes a declaration and a first implementation of at least one custom function;
   obtaining, using the public landing page, login credentials for a customer tenant of a cloud platform;
   redirecting, from the public landing page, to a private web application for the customer tenant for the cloud platform add-in, wherein the private web application includes for each of the at least one custom function, a second implementation of the custom function that is configured to retrieve customer-specific cloud platform data of the customer tenant, wherein the redirecting comprises replacing, for each custom function, the first implementation of the custom function with the second implementation of the custom function;
   receiving a user request in the spreadsheet application to use a first custom function;
   invoking the second implementation of the first custom function to retrieve customer-specific cloud platform data for the customer tenant; and
   providing retrieved customer-specific cloud platform data for the customer tenant to the spreadsheet application for rendering in the spreadsheet application.

2. The computer-implemented method of claim 1, wherein the customer-specific cloud platform data comprises customer-specific data model information.

3. The computer-implemented method of claim 2, wherein the customer-specific cloud platform data comprises metadata about the customer-specific data model information.

4. The computer-implemented method of claim 1, wherein first implementations are replaced with second implementations using a global variable that is declared in the public landing page.

5. The computer-implemented method of claim 1, further comprising:
   receiving, from a user, a second user request in the spreadsheet application to use a second custom function;
   determining that the user is not authenticated to the cloud platform; and
   in response to determining that the user is not authenticated to the cloud platform, invoking the first implementation of the second custom function.

6. The computer-implemented method of claim 5, wherein the first implementation of the second custom function is configured to notify the user that the user has to be authenticated to the cloud platform to use the second implementation of the second custom function.

7. The computer-implemented method of claim 1, wherein the spreadsheet application is a desktop application.

8. The computer-implemented method of claim 1, wherein the spreadsheet application is a web application.

9. The computer-implemented method of claim 1, further comprising connecting to the cloud platform using the login credentials.

10. The computer-implemented method of claim 9, further comprising retrieving application state information upon connecting to the cloud platform, wherein the application state information includes application settings and customer-specific parameters.

11. The computer-implemented method of claim 10, wherein invoking the second implementation of the first custom function to retrieve customer-specific cloud platform data for the customer tenant comprises retrieving, by the second implementation of the first custom function, at least some of the application state information.

12. The computer-implemented method of claim 10, wherein invoking the second implementation of the first custom function to retrieve customer-specific cloud platform data for the customer tenant comprises connecting to the cloud platform to retrieve the customer-specific cloud platform data.

13. A system comprising:
   one or more computers; and
   a computer-readable medium coupled to the one or more computers having instructions stored thereon which, when executed by the one or more computers, cause the one or more computers to perform operations comprising:

upon loading of a spreadsheet application, automatically loading a manifest for a cloud platform add-in of the spreadsheet application, wherein the manifest refers to a public landing page for the cloud platform add-in;

in response to loading of the manifest, automatically loading the public landing page of the cloud platform add-in of the spreadsheet application, wherein the public landing page includes a declaration and a first implementation of at least one custom function;

obtaining, using the public landing page, login credentials for a customer tenant of a cloud platform;

redirecting, from the public landing page, to a private web application for the customer tenant for the cloud platform add-in, wherein the private web application includes for each of the at least one custom function, a second implementation of the custom function that is configured to retrieve customer-specific cloud platform data of the customer tenant, wherein the redirecting comprises replacing, for each custom function, the first implementation of the custom function with the second implementation of the custom function;

receiving a user request in the spreadsheet application to use a first custom function;

invoking the second implementation of the first custom function to retrieve customer-specific cloud platform data for the customer tenant; and providing retrieved customer-specific cloud platform data for the customer tenant to the spreadsheet application for rendering in the spreadsheet application.

14. The system of claim 13, wherein the customer-specific cloud platform data comprises customer-specific data model information.

15. The system of claim 14, wherein the customer-specific cloud platform data comprises metadata about the customer-specific data model information.

16. The system of claim 13, wherein first implementations are replaced with second implementations using a global variable that is declared in the public landing page.

17. A computer program product encoded on a non-transitory storage medium, the product comprising non-transitory, computer readable instructions for causing one or more processors to perform operations comprising:

upon loading of a spreadsheet application, automatically loading a manifest for a cloud platform add-in of the spreadsheet application, wherein the manifest refers to a public landing page for the cloud platform add-in;

in response to loading of the manifest, automatically loading the public landing page of the cloud platform add-in of the spreadsheet application, wherein the public landing page includes a declaration and a first implementation of at least one custom function;

obtaining, using the public landing page, login credentials for a customer tenant of a cloud platform;

redirecting, from the public landing page, to a private web application for the customer tenant for the cloud platform add-in, wherein the private web application includes for each of the at least one custom function, a second implementation of the custom function that is configured to retrieve customer-specific cloud platform data of the customer tenant, wherein the redirecting comprises replacing, for each custom function, the first implementation of the custom function with the second implementation of the custom function;

receiving a user request in the spreadsheet application to use a first custom function;

invoking the second implementation of the first custom function to retrieve customer-specific cloud platform data for the customer tenant; and providing retrieved customer-specific cloud platform data for the customer tenant to the spreadsheet application for rendering in the spreadsheet application.

18. The computer program product of claim 17, wherein the customer-specific cloud platform data comprises customer-specific data model information.

19. The computer program product of claim 18, wherein the customer-specific cloud platform data comprises metadata about the customer-specific data model information.

20. The computer program product of claim 17, wherein first implementations are replaced with second implementations using a global variable that is declared in the public landing page.

* * * * *